US008805674B2

(12) United States Patent
Chang et al.

(10) Patent No.: US 8,805,674 B2
(45) Date of Patent: Aug. 12, 2014

(54) ELECTRONIC DEVICE AND METHOD FOR SUPPORTING MULTIPLE LANGUAGES IN IMAGE MEASUREMENT PROGRAMS

(75) Inventors: Chih-Kuang Chang, New Taipei (TW); Zhi-Jun Zou, Shenzhen (CN); Zhong-Kui Yuan, Shenzhen (CN); Dong-Hai Li, Shenzhen (CN); Yu-Hua Xu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 204 days.

(21) Appl. No.: 13/412,637

(22) Filed: Mar. 6, 2012

(65) Prior Publication Data
US 2012/0278063 A1 Nov. 1, 2012

(30) Foreign Application Priority Data

Apr. 28, 2011 (CN) .......................... 2011 1 0108665

(51) Int. Cl.
*G06F 7/76* (2006.01)

(52) U.S. Cl.
USPC ............................................................ 704/8

(58) Field of Classification Search
USPC ............................................................ 704/8
See application file for complete search history.

(56) References Cited

U.S. PATENT DOCUMENTS 7,475,233 B2 * 1/2009 Rothman et al. .................. 713/1
8,555,238 B2 * 10/2013 White et al. .................. 717/100

\* cited by examiner

*Primary Examiner* — Susan McFadden
(74) *Attorney, Agent, or Firm* — Novak Druce Connolly Bove + Quigg LLP

(57) ABSTRACT

An electronic device connected to a measurement machine is installed with an image measurement program. The electronic device records detailed information in relation to a new language file added to a template file provided by the image measurement program, and creates one or more executable files for the image measurement program based on the template file. When the image measurement program is started, the electronic device adds the new language to a language selection menu of a user interface of the image measurement program by executing the one or more executable files, displays all languages available to the image measurement program under the language selection menu of the user interface, and after selection and displays all information in a user-selected language.

9 Claims, 3 Drawing Sheets

ELECTRONIC DEVICE AND METHOD FOR SUPPORTING MULTIPLE LANGUAGES IN IMAGE MEASUREMENT PROGRAMS

BACKGROUND

1. Technical Field

Embodiments of the present disclosure relates to three-dimensional (3D) measurement technology, and more particularly, to an electronic device and a method for supporting multiple languages in image measurement programs.

2. Description of Related Art

In 3D measurement field, image measurement programs are software for controlling measurement machines to measure products. Users speaking different languages may desire for the same measurement program to provide different language versions. If a user of a measurement program wants to add a new language to a purchased measurement program, the task of adding the new language is often done by a designer part of the purchased measurement program because the user cannot add the new language himself/herself.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
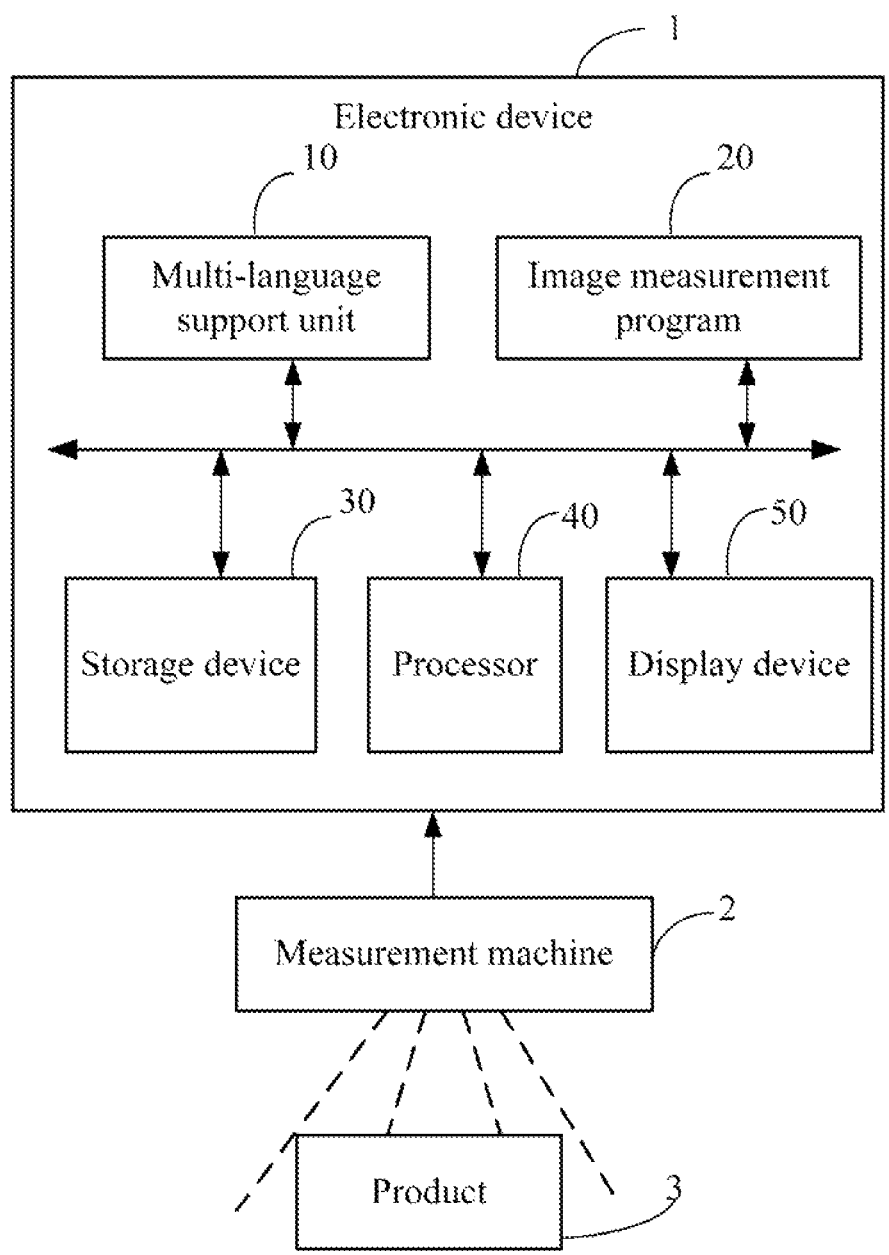
FIG. 1 is a block diagram of one embodiment of an electronic device comprising a multi-language support unit.

FIG. 1 is a block diagram of one embodiment of an electronic device 1 comprising a multi-language support unit 10. The electronic device 1 is electronically connected to a measurement machine 2. Depending on the embodiment, the electronic device 1 may be a computer, a server, or a workstation. An image measurement program 20 installed within the electronic device 1 controls the measurement machine 2 to measure a product 3 (such as a mobile phone shell). The multi-language support unit 10 allows users to add new languages to the image measurement program 20, so that the image measurement program 20 may display a user interface of the image measuring program 20 in any favorite language of the users, measure the product 3 under the favorite language environment, and output measurement results in the favorite language. The languages may include English, simplified Chinese, traditional Chinese, and German, for example. The image measurement program 20 may be a PowerMetrix measurement program, or other kinds of measurement programs.

In one embodiment, the electronic device 1 further includes a storage device 30, a processor 40, and a display device 50. The multi-language support unit 10 and the image measurement program 20 include computerized code stored in the storage device 30 and to be processed by the processor 40. The storage system 30 may be a cache or an independent or a dedicated memory.

The display device 50 displays the user interface of the image measurement program 20 in a user-selected language, and this language can be a new language added by the multi-language support unit 10, and displays the measurement results in the user-selected language.

Figure 2:
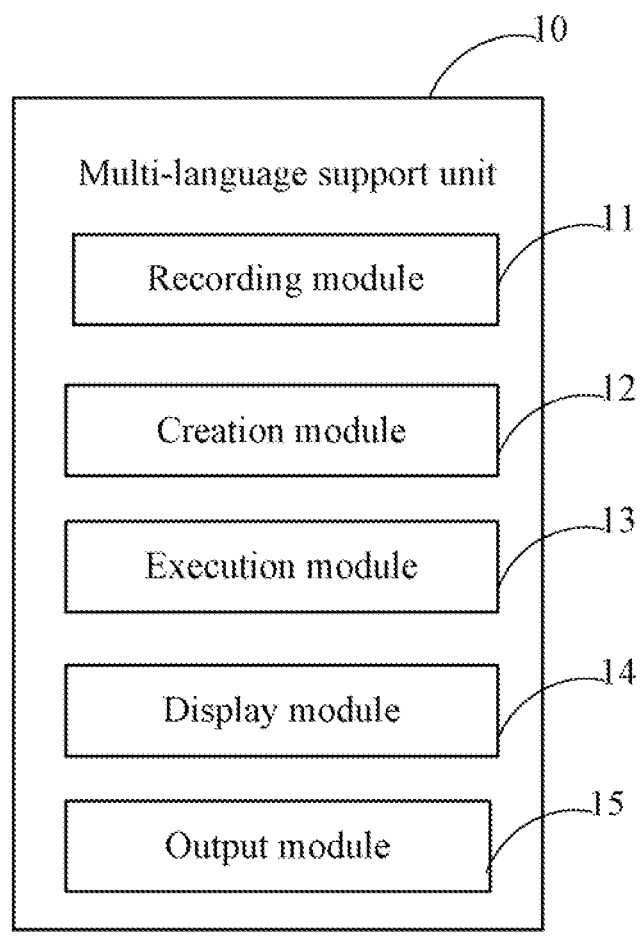
FIG. 2 is a block diagram of one embodiment of function modules of the multi-language support unit in FIG. 1.

As shown in FIG. 2, the multi-languages supporting unit 10 includes a recording module 11, a creation module 12, an execution module 13, a display module 14, and an output module 15. The modules 11-14 may include computerized code in the form of one or more programs (computer-readable program code) that are stored in the storage device 30. The computerized code include instructions that are executed by the processor 40 to provide the below-described functions of the module 11-14 and as illustrated in FIG. 3.

Figure 3:
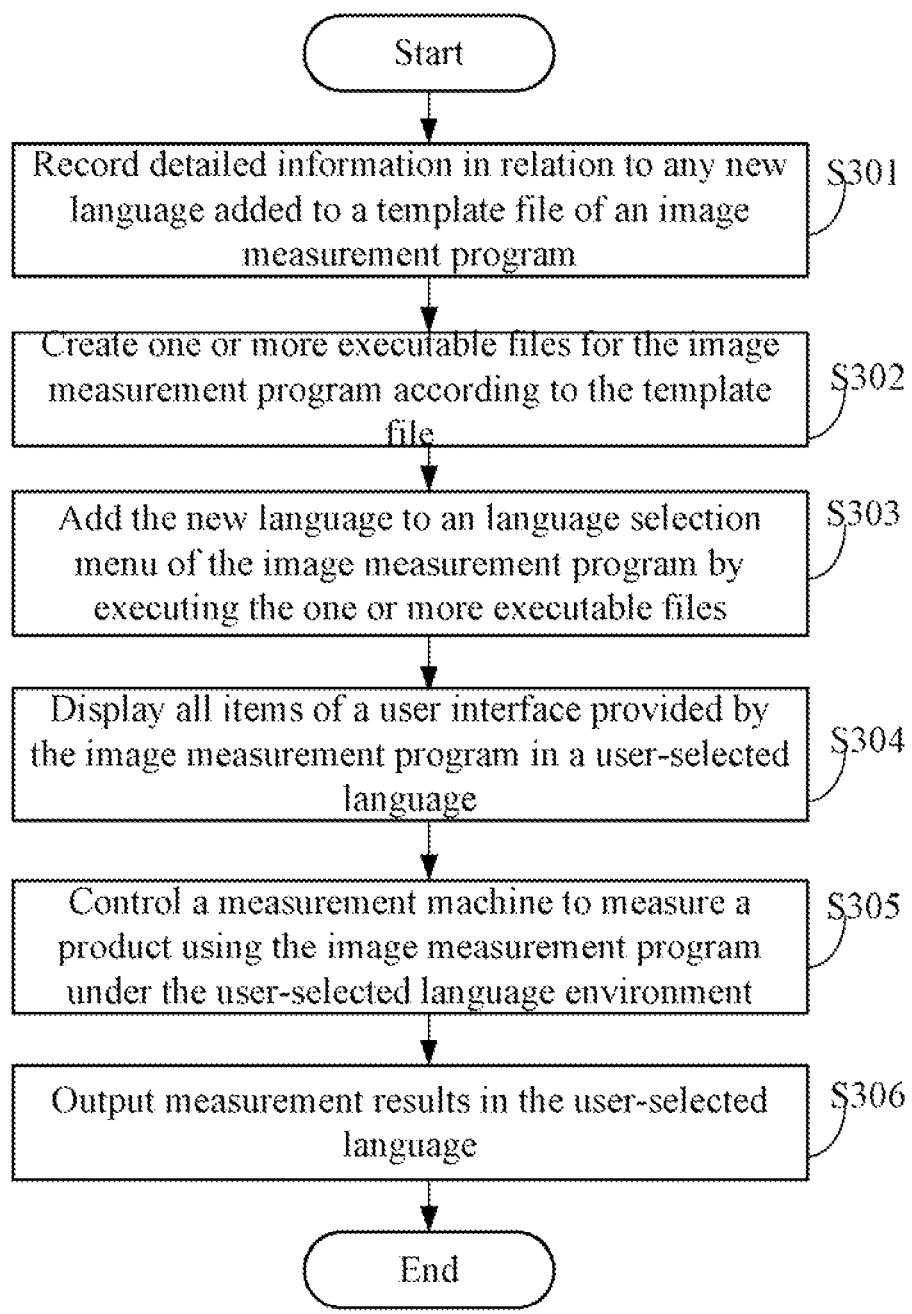
FIG. 3 is a flowchart of one embodiment of a method for supporting multiple languages in image measurement programs.

FIG. 3 is a flowchart of one embodiment of a method for supporting multiple languages in the image measurement program 20. Depending on the embodiment, additional blocks may be added, others removed, and the ordering of the blocks may be changed.

In step S301, the recording module 11 records detailed information in relation to a new language which can be added to a template file provided for the user by the image measurement program 20. In this embodiment, the template file is a spreadsheet stored in an installation directory of the image measurement program 20, and is accessible and editable by authorized users, such as designers or authorized users of the image measurement program 20. In another embodiment, the template file may be in other format, such as a ".txt" format. The detailed information includes all items (such as menus, options, buttons) provided by the user interface and expressed in the new language. For example, the menus provided by the user interface of the image measurement program 20 may include menus named "File," "Tools," "Measurement," "Settings," and "Help," for example. Each of the menus may include a plurality of function options. The new language may be in any language required by the user.

In step S302, the creation module 12 creates one or more executable files for the image measurement program 20 according to the template file infilled and completed by the user. For example, if the image measurement program 20 is a PowerMetrix measurement program, the one or more executable files may include a "LanguageList.dat" file and a "PowerMetrix.Language.dll" file. In this embodiment, the template file and the one or more executable files are stored in the storage device 30.

In step S303, when the image measurement program 20 is started (for example, using the processor 40), the execution module 13 adds the new language to a language selection menu of the user interface by executing the one or more executable files.

In step S304, the display module 14 displays on the display device 50 all languages available to the image measurement program 20 under the language selection menu of the user interface, and displays all items (such as menus, options, buttons) provided by the user interface in a user-selected language, such as simplified Chinese.

In step S305, the image measurement program 20 controls the measurement machine 2 to measure the product 3 under the user-selected language environment.

In step S306, the output module 15 outputs measurement results in the user-selected language on the display device 50.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method being executed by a processor of an electronic device for supporting multiple languages in an image measurement program, the method comprising:
   recording detailed information in relation to a new language file added to a template file, wherein the template file is provided by the image measurement program and stored in an installation directory of the image measurement program in a storage device, and the template file is accessible and editable by authorized users of the image measurement program, and the detailed information comprises items provided by a user interface of the image measurement program and expressed in the new language;
   creating one or more executable files for the image measurement program according to the template file;
   in response that the image measurement program is started, adding the new language to a language selection menu of the user interface by executing the one or more executable files; and
   displaying all languages available to the image measurement program under the language selection menu of the user interface, and displaying all the items provided by the user interface in a user-selected language on a display device.

2. The method of claim 1, further comprising:
   controlling a measurement machine electronically connected to the electronic device to measure a product under the user-selected language environment by the image measurement program; and
   outputting measurement results of the product in the user-selected language on the display device.

3. The method of claim 1, wherein the electronic device is a computer, a server, or a work station.

4. A non-transitory storage medium storing a set of instructions, the set of instructions capable of being executed by a processor of an electronic device to perform a method for supporting multiple languages in an image measurement program, the method comprising:
   recording detailed information in relation to a new language file added to a template file, wherein the template file is editable by authorized users and provided by the image measurement program and stored in an installation directory of the image measurement program in a storage device, and the template file is accessible and editable by authorized users of the image measurement program, and the detailed information comprises items provided by a user interface of the image measurement program and expressed in the new language;
   creating one or more executable files for the image measurement program according to the template file;
   in response that the image measurement program is started, adding the new language to a language selection menu of the user interface by executing the one or more executable files; and
   displaying all languages available to the image measurement program under the language selection menu of the user interface, and displaying all the items provided by the user interface in a user-selected language on a display device.

5. The medium of claim 4, wherein the method further comprises:
   controlling a measurement machine electronically connected to the electronic device to measure a product under the user-selected language environment by the image measurement program; and
   outputting measurement results of the product in the user-selected language on the display device.

6. The medium of claim 4, wherein the electronic device is a computer, a server, or a work station.

7. An electronic device, comprising:
   a storage device;
   a processor; and
   one or more programs that are stored in the storage device and being executed by the at least one processor, the one or more programs comprising:
   a recording module operable to record detailed information in relation to a new language file added to a template file, wherein the template file is provided by the image measurement program and stored in an installation directory of the image measurement program in a storage device, and the template file is accessible and editable by authorized users of the image measurement program, and the detailed information comprises items provided by a user interface of the image measurement program and expressed in the new language;
   a creation module operable to create one or more executable files for the image measurement program according to the template file;
   an execution module operable to add the new language to a language selection menu of the user interface by executing the one or more executable files in response that the image measurement program is started; and
   a display module operable to display all languages available to the image measurement program under the language selection menu of the user interface, and displaying all the items provided by the user interface in a user-selected language on a display device.

8. The device of claim 7, wherein the one or more programs further comprise an output module operable to output measurement results of a product in the user-selected language on the display device after the image measurement program has finished controlling a measurement machine electronically connected to the electronic device to measure the product under the user-selected language environment.

9. The device of claim 7, wherein the electronic device is a computer, a server, or a work station.

* * * * *